United States Patent
Lin

(10) Patent No.: US 8,023,196 B2
(45) Date of Patent: Sep. 20, 2011

(54) PROJECTION LENS AND PROJECTION DEVICE USING THE SAME

(75) Inventor: Ming-Kuen Lin, Yunlin County (TW)

(73) Assignee: Qisda Corporation, Taoyuan County (TW)

( * ) Notice: Subject to any disclaimer, the term of this patent is extended or adjusted under 35 U.S.C. 154(b) by 239 days.

(21) Appl. No.: 12/314,397

(22) Filed: Dec. 10, 2008

(65) Prior Publication Data

US 2009/0153978 A1 Jun. 18, 2009

(30) Foreign Application Priority Data

Dec. 14, 2007 (TW) ................................ 96148035 A

(51) Int. Cl.
*G02B 9/04* (2006.01)
*G02B 9/34* (2006.01)
*G02B 13/04* (2006.01)

(52) U.S. Cl. .................... 359/650; 359/793; 359/753

(58) Field of Classification Search .......... 359/749–756, 359/761, 763, 770–771, 781–784, 793, 676, 359/682, 686, 689, 691, 649–651

See application file for complete search history.

(56) References Cited

U.S. PATENT DOCUMENTS

| | | | |
|---|---|---|---|
| 4,738,518 A * | 4/1988 | Hilbert et al. | 359/781 |
| 5,485,314 A | 1/1996 | Sato | |
| 5,644,435 A | 7/1997 | Shikama | |
| 5,822,128 A * | 10/1998 | Sekine | 359/651 |
| 5,909,307 A * | 6/1999 | Koyama | 359/781 |
| 6,404,564 B1 * | 6/2002 | Yamada | 359/651 |
| 7,457,045 B2 * | 11/2008 | Fujisaki et al. | 359/680 |

* cited by examiner

*Primary Examiner* — Darryl J Collins
*Assistant Examiner* — Zachary Wilkes

(57) ABSTRACT

A projection lens and a projection device using the same are provided. The projection device includes a projection lens and an optical element. The projection lens includes a first lens group and a second lens group from an image side sequentially. The first lens group has a negative refracting power, and the first lens group includes an aspherical lens surface. The second lens group has a positive refracting power. The first lens group has a first focal length f1, and the second lens group has a second focal length f2. The first focal length f1 and the second focal length f2 satisfy the following two conditions: $0.5<|f1/f2|<1.5$, and $-35\text{ mm}<f1<-15\text{ mm}$.

19 Claims, 2 Drawing Sheets

PROJECTION LENS AND PROJECTION DEVICE USING THE SAME

This application claims the benefit of Taiwan application Serial No. 96148035, filed Dec. 14, 2007, the subject matter of which is incorporated herein by reference.

BACKGROUND OF THE INVENTION

1. Field of the Invention

The invention relates in general to a projection lens and a projection device using the same, and more particularly to a projection lens having two lens groups and a projection device using the same.

2. Description of the Related Art

Along with the advance in technology, electronic devices are directed towards lightweight, slimness, simplicity and compactness. For the projection device to project a high quality image, the projection lens must have a certain number of lens group and lens. Thus, how to provide a projection lens which achieves the above object with lesser number of lens group and lens has become a focus in the research and development of projection device.

SUMMARY OF THE INVENTION

The invention is directed to a projection lens and a projection device using the same. The projection device is capable of projecting an image by a projection lens having two lens groups.

According to a first aspect of the present invention, a projection lens disposed in a projection device is provided. The projection lens from an image side sequentially comprises a first lens group and a second lens group. The first lens group has a negative refracting power, and the first lens group includes an aspherical lens surface. The second lens group has a positive refracting power. The first lens group has a first focal length f1, and the second lens group has a second focal length f2. The first focal length f1 and the second focal length f2 satisfy the following two conditions:

0.5<|f1/f2|<1.5, and −35 mm<f1<−15 mm.

According to a second aspect of the present invention, a projection device comprising a projection lens and an optical element is provided. The projection lens sequentially comprises a first lens group and a second lens group from an image side. The first lens group has a negative refracting power, and includes an aspherical lens surface. The second lens group has a positive refracting power. The projection lens is located between the image side and the optical element. The first lens group has a first focal length f1, and the second lens group has a second focal length f2. The first focal length f1 and the second focal length f2 satisfy the following two conditions: 0.5<|f1/f2|<1.5; and −35 mm<f1<−15 mm.

The invention will become apparent from the following detailed description of the preferred but non-limiting embodiments. The following description is made with reference to the accompanying drawings.

DETAILED DESCRIPTION OF THE INVENTION

Figure 1:
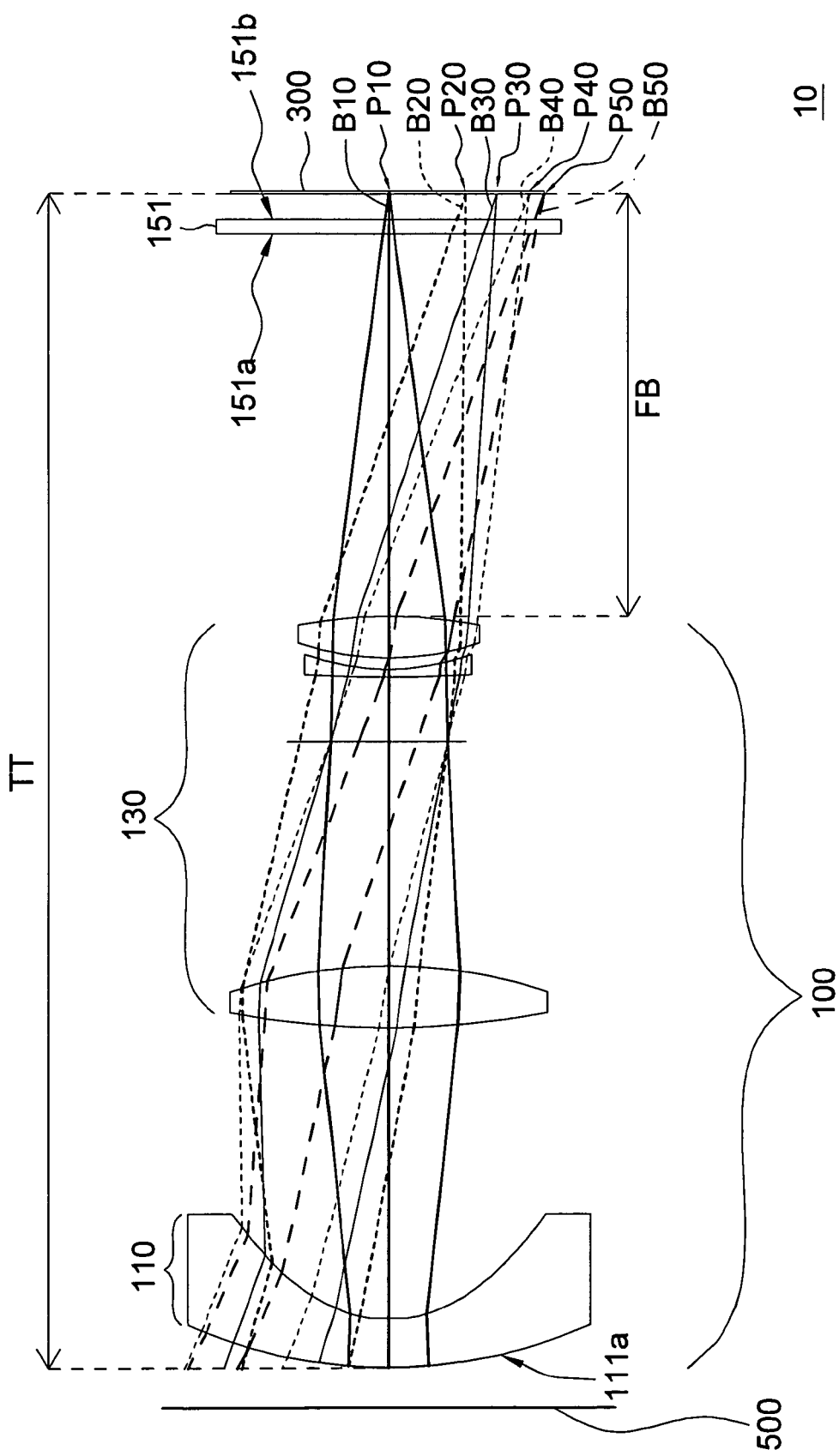
FIG. 1 shows a perspective of a projection device according to a first embodiment of the invention.

Referring to FIG. 1, a perspective of a projection device according to the first embodiment of the invention is shown.

The projection device 10 comprises a projection lens 100 and an optical element 300. The projection lens 100 sequentially comprises a first lens group 110 and a second lens group 130 from an image side 500. The first lens group 110 has a negative refracting power, and includes an aspherical lens surface 111a. The second lens group 130 has a positive refracting power. The projection lens 100 is located between the image side 500 and the optical element 300. The first lens group 110 has a first focal length f1, and the second lens group 130 has a second focal length f2. The first focal length f1 and the second focal length f2 satisfy the following two conditions: 0.5<|f1/f2|<1.5; and −35 mm<f1<−15 mm. Through the design of the aspherical lens surface 111a, the first focal length f1 and the second focal length f2, the projection device 10 can project an image with a simplified projection lens 100.

The optical element 300 is a digital micro-mirror device (DMD) for example. The DMD has many micro-mirrors each corresponding to a pixel and capable of rotating to different angles. After the DMD receives a control signal, the DMD will control each micro-mirror to rotate so as to change the incident angle of the incoming light. Thus, the data of each pixel is defined and the to-be-displayed image is projected to the image side 500 via the projection lens 100.

Referring to Table 1, the relationship of the length vs. focal length of a projection lens is shown.

TABLE 1

| TT (mm) | 50 | 60 | 70 | 80 | 90 | 100 | 110 |
|---|---|---|---|---|---|---|---|
| FW (mm) | 22 | 22 | 22 | 22 | 22 | 22 | 22 |
| f1 (mm) | −69.70 | −41.72 | −28.21 | −20.86 | −16.22 | −13.12 | −10.95 |
| f2 (mm) | 21.83 | 23.00 | 24.18 | 25.20 | 25.95 | 26.47 | 26.83 |
| |f1/f2| | 3.19 | 1.81 | 1.17 | 0.83 | 0.63 | 0.50 | 0.41 |

The projection lens 100 has an overall length TT and an effective focal length (EFL) FW. Generally speaking, the effective focal length FW of the projection lens used in the projection device ranges from 15 mm to 30 mm. In the present embodiment of the invention, the effective focal length FW of the projection lens 100 is exemplified as 22 mm. As the ratio of the first focal length f1 vs. the second focal length f2 gradually increases, the overall length TT of the projection lens 100 also gradually decreases as indicated in Table 1. A shorter overall length UT corresponds to a reduced a back focal length (BFL) FB (as indicated in FIG. 1) of the projection lens 100, wherein the back focal length FB is the distance from the last lens surface of the second lens group 130 to the optical element 300. The projection device 10 provides a light to the optical element 300 by a light source (not illustrated in the diagram). If the back focal length FB is not sufficient and the distance between the second lens group 130 and the optical element 300 is too short, the second lens group 130 will interfere with the light provided by the light source. Consequently, part of the light will be blocked and the projected image will be affected. The back focal length FB of the projection device 10 preferable ranges from 20 mm to 40 mm.

If the projection lens 100 has a longer overall length TT, the back focal length FB increases accordingly. The projection lens 100 with a longer overall length TT will increase the volume of the projection device 10 and the error rate in the assembly of internal optical elements. Besides, a longer back focal length FB will also increase the aberration of the image projected by the projection lens 100, hence deteriorating the quality of the image projected onto the image side 500 by the optical element 300. Thus, the overall length TT of the projection lens 100 preferably ranges from 60 mm to 110 mm.

The optical data and the disposition of each lens in the first lens group 110 and the second lens group 130 according to a preferred embodiment of the invention are disclosed below. However, the technology of the invention is not limited thereto.

Figure 2A:
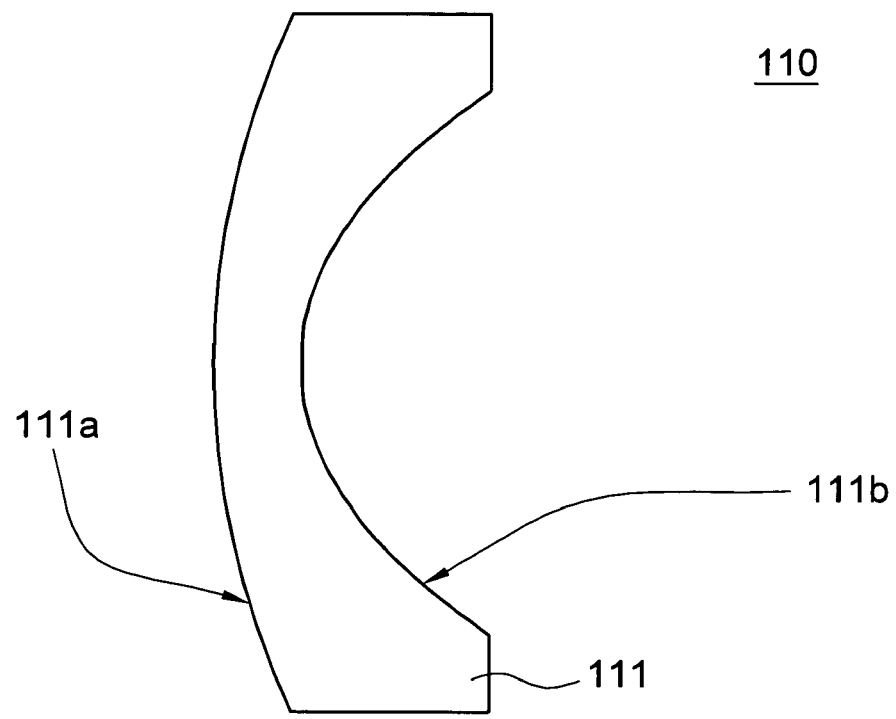
FIG. 2A shows a perspective of a first lens group of FIG. 1.
Figure 2B:
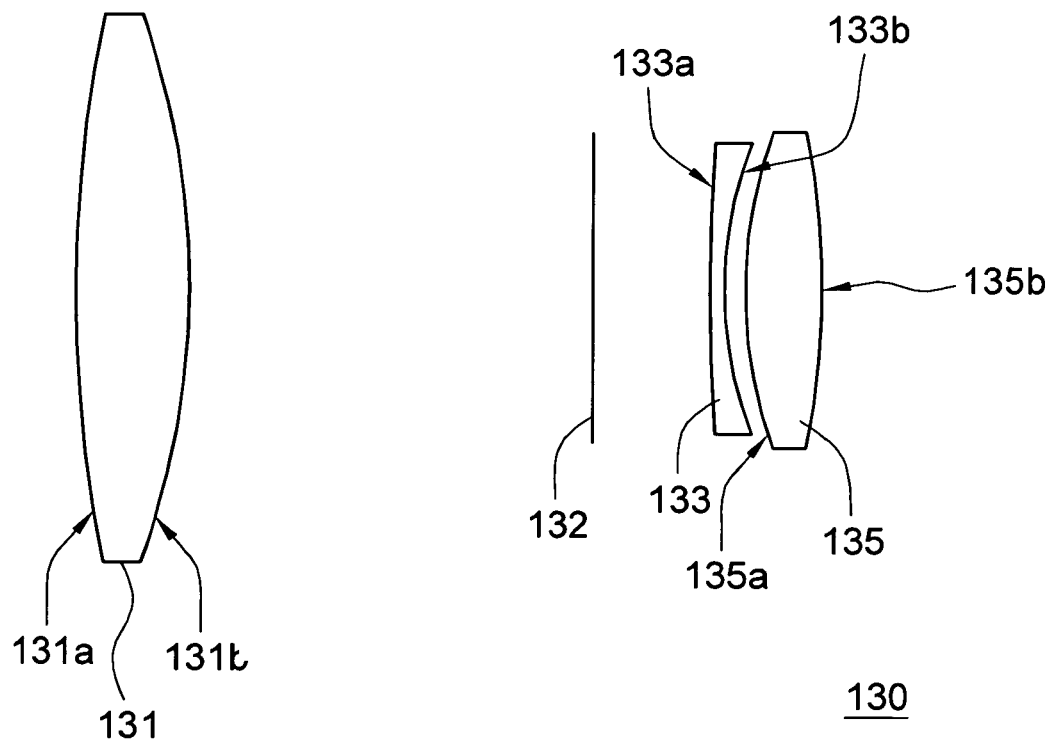
FIG. 2B shows a perspective of a second lens group of FIG. 1.

Referring to FIG. 2A and FIG. 2B. FIG. 2A shows a perspective of a first lens group of FIG. 1. FIG. 2B shows a perspective of a second lens group of FIG. 1. The total number of the lens in the first lens group 110 and the second lens group 130 is equal to 4. The first lens group 110 comprises a first lens 111. The second lens group 130, from the image side 500, sequentially comprises a second lens 131, an aperture stop 132, a third lens 133 and a fourth lens 135. Preferably, the projection lens 100 is a non-telecentric lens, so that the height of the lens far away from the image side 500 can be reduced, wherein the height of a lens is the height from the optical axis of a lens to its edge.

The surface polynomial of the aspherical lens surface is expressed as:

$$\frac{X^2}{R + \sqrt{R^2 - (1+K)X^2}} + AX^4 + BX^6 + CX^8 + DX^{10} + \ldots$$

The aspherical lens surface has a horizontal distance X to the axis of rotational symmetry, and further has an apex curvature radius R and a conic curve constant K. In the surface polynomial of aspherical lens surface, the correction coefficients respectively corresponding to X4, X6, X8 and X10 are A, B, C and D. The characteristics of an aspherical lens surface can be well defined when the polynomial is expressed up to the X10 term, therefore the present embodiment of the invention only uses A, B, C and D for exemplification.

As indicated in FIG. 2A, the first lens group 110 at least comprises a first lens 111, and one side of the first lens 111 comprises an aspherical lens surface 111a. Preferably, the first lens 111 is an aspherical lens, and the other side of the first lens 111 further comprises another aspherical lens surface 111b. The first lens 111 is convexed to the image side 500 (illustrated in FIG. 1). The respective parameters for the aspherical lens surfaces 111a and 111b are illustrated in Table 2:

TABLE 2

|   | Aspherical Lens Surface 111a | Aspherical Lens Surface 111b |
|---|---|---|
| K | −0.33 | −0.69 |
| A | −6.1080445e−06 | 4.4640033e−05 |
| B | −2.2752672e−07 | −4.6820564e−07 |
| C | 7.3138981e−10 | 8.9361124e−10 |
| D | −1.04673e−12 | −7.44734e−12 |

Moreover, the aspherical first lens 111 can be made of glass or plastics. As the aspherical lens surfaces 111a and 111b are complicated, it is more difficult to process the first lens 111 made from glass. If the first lens 111 is made of plastics with high transparency, the aspherical lens surfaces 111a and 111b can be formed by way of ejection, further reducing the manufacturing cost for the first lens 111.

Besides, the distance from the apex of the aspherical lens surface 111a to the apex of the aspherical lens surface 111b is substantially 3.5 mm, a central curvature radius of the aspherical lens surface 111a is 24.16 mm, and a central curvature radius of the aspherical lens surface 111b is 8.99 mm.

As indicated in FIG. 2B, in the second lens group 130, the second lens 131 has a second front surface 131a and a second back surface 131b, the third lens 133 has a third front surface 133a and a third back surface 133b, and the fourth lens 135 has a fourth front surface 135a and a fourth back surface 135b. The second front surface 131a has a curvature radius being 57.21 mm, and is further convexed to the image side 500. The second back surface 131b has a curvature radius being −32.85 mm, and is further concaved to the image side 500. Thus, the second lens 131 is a biconvex lens, and the distance from the apex of the second front surface 131a to the apex of the second back surface 131b is substantially 4.4 mm.

The third front surface 133a has a curvature radius being 74.37 mm, and is further convexed to the image side 500. The third back surface 133b has a curvature radius being 16.98 mm, and is further convexed to the image side 500. Thus, the third lens 133 is a meniscus lens, and is convexed to the aperture stop 132. The distance from the apex of the third front surface 133a to the apex of the third back surface 133b is substantially 0.65 mm.

The fourth front surface 135a has a curvature radius being 19.99 mm, and is further convexed to the image side 500. The fourth back surface 135b has a curvature radius being −31.80 mm, and is further concaved to the image side 500. Thus, the fourth lens 135 is a biconvex lens, and the distance from the apex of the fourth front surface 135a to the apex of the fourth back surface 135b is substantially 2.96 mm.

As indicated in FIG. 1, the projection device 10 further comprises a transparent plate 151 disposed between the optical element 300 and the fourth lens 135. The transparent plate 151 has a fifth front surface 151a and a fifth back surface 151b. The distance from the apex of the fifth front surface 151a to the apex of the fifth back surface 151b is substantially 1.05 mm. As indicated in Table 3, the preferred disposition of the projection device 10 of the present embodiment of the invention and the projection lens 100 thereof is disclosed below:

TABLE 3

|   | Curvature Radius | Interval (mm) | Refractive Index | Abbe Number |
|---|---|---|---|---|
| Image Side 500 | ∞ | 2000 | | |
| Aspherical Lens Surface 111a | 24.16 | 3.5 | 1.53 | 56 (111v) |
| Aspherical Lens Surface 111b | 8.99 | 20.59 | (111n) | |
| Second Front Surface 131a | 57.21 | 4.4 | 1.64 | 60.10 (131v) |
| Second Back Surface 131b | −32.85 | 15.77 | (131n) | |
| Aperture Stop 132 | ∞ | 4.47 | | |
| Third Front Surface 133a | 74.37 | 0.65 | 1.85 | 23.80 (133v) |
| Third Back Surface 133b | 16.98 | 0.80 | (133n) | |
| The Fourth Front Surface 135a | 19.99 | 2.96 | 1.72 | 50.20 (135v) |
| Fourth Back Surface 135b | −31.80 | 27 | (135n) | |
| Fifth Front Surface 151a | ∞ | 1.05 | 1.49 | 70.20 (151v) |
| Fifth Back Surface 151b | ∞ | 1.88 | (151n) | |
| Optical Element 300 | ∞ | | | |

In Table 3, each interval is the distance from the center of a surface to the center of the next surface. For example, the interval from the image side 500 to the aspherical lens surface 111a is 2000 mm, the distance from the apex of the aspherical lens surface 111a to the apex of the aspherical lens surface 111b is 3.5 mm is exactly equal to the central thickness of the first lens 111. Other distances can be obtained in the same manner.

Besides, the distance between two lenses is the interval from the center of the back surface of the previous lens to the center of the front surface of the next lens. The distance from the first lens 111 to the second lens 131 is substantially 20.59 mm. The distance from the second lens 131 to the aperture stop 132 is substantially 15.77 mm. The distance from the aperture stop 132 to the third lens 133 is substantially 4.47 mm. The distance from the third lens 133 to the fourth lens 135 is substantially 0.80 mm. The distance from the fourth lens 135 to the transparent plate 151 is substantially 27 mm. The distance from the transparent plate 151 to the optical element 300 is substantially 1.88 mm. The distance from the fourth lens 135 to the optical element 300 is substantially 29.93 mm, that is, the back focal length FB of the projection lens 100 is 29.93 mm.

According to the above disposition of the projection device 10, the overall length TT of the projection lens 100 is substantially 83 mm, the first focal length f1 of the first lens group 110 with negative refracting power is −29.20 mm, the second focal length f2 of the second lens group 130 with positive refracting power is 28.27 mm, the ratio |f1/f2| of the first focal length f1 vs. the second focal length f2 is substantially equal to 1.03, and the effective focal length FW of the projection device 10 is 22 mm.

According to the projection lens 100 and the projection device 10 using the same disclosed in the above embodiments of the invention, in an experiment, the color shift, the field curvature and the aberration measured by the projection lens 100 are all within the standards of projected image. Besides, the combined aberration of the light with different wavelengths has very tiny error under different off-axial heights of the projection lens 100 and has symmetry. Thus, with the disposition of the projection lens 100, the projection device 10 can project an image with excellent quality.

According to the projection lens and the projection device using the same disclosed in the above embodiments of the invention, the first lens group comprises an aspherical lens, and the second lens group comprises three lenses with different optical characteristics. However, anyone who is skilled in the technology of the invention will understand that the invention is not limited thereto. Any designs of projection device whose projection lens comprises two lens groups, wherein the first lens group comprises a lens with an aspherical lens surface is within the scope of protection of the invention.

According to the projection lens and the projection device using the same disclosed in the above embodiments of the invention, with the combination of four lenses assigned to two groups, the projection lens can project an image with excellent quality when the effective focal length is 22 mm. With the aspherical lens surface and the non-telecentric structure, the projection device further reduces the number of lenses required in the projection lens and reduces the accumulative error caused when too many lenses are used. Thus, the projection device of the present embodiment of the invention projects an image with excellent quality through the simplified projection lens.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A projection lens disposed in a projection device, wherein the projection lens from an image side sequentially comprises:
only two lens groups, comprising:
a first lens group having a negative refracting power and comprising an aspherical lens surface; and
a second lens group having a positive refracting power, wherein a combined total number of lenses in the first and second lens groups is equal to 4;
wherein, the first lens group has a first focal length f1, the second lens group has a second focal length f2, and the first focal length f1 and the second focal length f2 satisfy the following two conditions:

$0.5<|f1/f2|<1.5$; and $-31$ mm$<f1<-15$ mm;

wherein the projection lens has an overall length ranging from 60 mm to 110 mm and an effective focal length ranging from 15 mm to 30 mm.

2. The projection lens according to claim 1, wherein the first lens group comprises a first lens, the second lens group from the image side sequentially comprises a second lens, an aperture stop, a third lens and a fourth lens.

3. The projection lens according to claim 2, wherein the first lens is an aspherical lens, one side of the first lens has the aspherical lens surface, and the other side of the first lens has another aspherical lens surface.

4. The projection lens according to claim 3, wherein the first lens is made of plastics.

5. The projection lens according to claim 2, wherein the second lens is a biconvex lens, the third lens is a meniscus lens which is convexed to the aperture stop, and the fourth lens is a biconvex lens.

6. The projection lens according to claim 2, wherein the curvature radiuses of a front surface and a back surface of the first lens from the image side are respectively equal to 24.16 and 8.99 mm, the distance from the apex of the front surface to the apex of the back surface of the first lens is 3.5 mm;
the curvature radiuses of a front surface and a back surface of the second lens from the image side are respectively equal to 57.21 mm and −32.85 mm, the distance from the apex of the front surface to the apex of the back surface of the second lens is 4.4 mm, the distance from the apex of the back surface of the first lens to the apex of the front surface of the second lens is 20.59 mm, and the distance from the apex of the back surface of the second lens to the aperture stop is 15.77 mm;
the curvature radiuses of a front surface and a back surface of the third lens from the image side are respectively equal to 74.37 mm and 16.98 mm, the distance from the apex of the front surface to the apex of the back surface of the third lens is 0.65 mm, and the distance from the aperture stop to the apex of the front surface of the third lens is 4.47 mm; and
the curvature radiuses of a front surface and a back surface of the fourth lens from the image side are respectively equal to 19.99 mm and −31.8 mm, the distance from the apex of the front surface to the apex of the back surface of the fourth lens is 2.96 mm, the distance from the apex of the back surface of the third lens to the apex of the front surface of the fourth lens is 0.8 mm, and the distance from the apex of the back surface of the fourth lens to an optical element is 29.93 mm.

7. The projection lens according to claim 1, wherein the first focal length f1 is −29.20 mm, the second focal length f2 is 28.27 mm, and the overall length is 83 mm.

8. The projection lens according to claim 1, wherein the first focal length f1 and the second focal length f2 satisfy the following condition:

$1<|f1/f2|<1.5$.

9. The projection lens according to claim 1, wherein the projection lens has a back focal length ranging from 20 mm to 40 mm, and the projection lens is a non-telecentric lens.

10. A projection device, comprising:
a projection lens from an image side sequentially comprising:
only two lens groups, comprising
a first lens group having a negative refracting power and comprising an aspherical lens surface; and
a second lens group having a positive refracting power, wherein the combined total number of lenses in the first and second lens groups is equal to 4; and
an optical element, wherein the projection lens is located between the image side and the optical element;
wherein, the first lens group has a first focal length f1, the second lens group has a second focal length f2, and the first focal length f1 and the second focal length f2 satisfy the following two conditions:

$0.5 < |f1/f2| < 1.5$; and $-31 \text{ mm} < f1 < -15 \text{ mm}$;

wherein the projection lens has an overall length ranging from 60 mm to 110 mm and an effective focal length ranging from 15 mm to 30 mm.

11. The projection device according to claim 10, wherein the first lens group comprises a first lens, and the second lens group from the image side sequentially comprises a second lens, an aperture stop, a third lens and a fourth lens.

12. The projection device according to claim 11, wherein the first lens is an aspherical lens, one side of the first lens has the aspherical lens surface, and the other side of the first lens has another aspherical lens surface.

13. The projection device according to claim 11, wherein the second lens is a biconvex lens, the third lens is a meniscus lens which is convexed to the aperture stop, and the fourth lens is a biconvex lens.

14. The projection device according to claim 11, wherein the curvature radiuses of a front surface and a back surface of the first lens from the image side are respectively equal to 24.16 mm and 8.99 mm, and the distance from the apex of the front surface to the apex of the back surface of the first lens is 3.5 mm;
the curvature radiuses of a front surface and a back surface of the second lens from the image side are respectively equal to 57.21 mm and −32.85 mm, the distance from the apex of the front surface to the apex of the back surface of the second lens is 4.4 mm, the distance from the apex of the back surface of the first lens to the apex of the front surface of the second lens is 20.59 mm, and the distance from the apex of the back surface of the second lens to the aperture stop is 15.77 mm;
the curvature radiuses of a front surface and a back surface of the third lens from the image side are respectively equal to 74.37 mm and 16.98 mm, the distance from the apex of the front surface to the apex of the back surface of the third lens is 0.65 mm, the distance from the aperture stop to the apex of the front surface of the third lens is substantially 4.47 mm; and
the curvature radiuses of a front surface and a back surface of the fourth lens from the image side are respectively equal to 19.99 mm and −31.8 mm, the distance from the apex of the front surface to the apex of the back surface of the fourth lens is 2.96 mm, the distance from the apex of the back surface of the third lens to the apex of the front surface of the fourth lens is substantially 0.8 mm, and the distance from the apex of the back surface of the fourth lens to the optical element is 29.93 mm.

15. The projection device according to claim 10, wherein the first focal length f1 is substantially −29.20 mm, the second focal length f2 is 28.27 mm, and the overall length is 83 mm.

16. The projection device according to claim 10, wherein the projection lens has a back focal length ranging from 20 mm to 40 mm, and the projection lens is a non-telecentric lens.

17. The projection device according to claim 10, wherein the first focal length f1 and the second focal length f2 satisfy the following condition:

$1 < |f1/f2| < 1.5$.

18. A projection lens disposed in a projection device, wherein the projection lens from an image side sequentially comprises:
a first lens group having a negative refracting power and comprising an aspherical lens surface, wherein the first lens group comprises a first lens; and
a second lens group having a positive refracting power, wherein the second lens group from the image side sequentially comprises a second lens, an aperture stop, a third lens and a fourth lens, the second lens is a biconvex lens, the third lens is a meniscus lens which is convexed to the aperture stop, the fourth lens is a biconvex lens, and a combined total number of lenses in the first and second lens groups is equal to 4;
wherein, the first lens group has a first focal length f1, the second lens group has a second focal length f2, and the first focal length f1 and the second focal length f2 satisfy the following two conditions:

$0.5 < |f1/f2| < 1.5$; and $-35 \text{ mm} < f1 < -15 \text{ mm}$;

wherein the projection lens has an overall length ranging from 60 mm to 110 mm and an effective focal length ranging from 15 mm to 30 mm.

19. A projection device, comprising:
a projection lens from an image side sequentially comprising:
a first lens group having a negative refracting power and comprising an aspherical lens surface, wherein the first lens group comprises a first lens; and
a second lens group having a positive refracting power, wherein the second lens group from the image side sequentially comprises a second lens, an aperture stop, a third lens and a fourth lens, the second lens is a biconvex lens, the third lens is a meniscus lens which is convexed to the aperture stop, the fourth lens is a biconvex lens, and the combined total number of lenses in the first and second lens groups is equal to 4; and
an optical element, wherein the projection lens is located between the image side and the optical element;
wherein, the first lens group has a first focal length f1, the second lens group has a second focal length f2, and the first focal length f1, and the second focal length f2 satisfy the following two conditions:

$0.5 < |f1/f2| < 1.5$; and $-35 \text{ mm} < f1 < -15 \text{ mm}$;

wherein the projection lens has an overall length ranging from 60 mm to 110 mm and an effective focal length ranging from 15 mm to 30 mm.

* * * * *